R. M. LOVEJOY.
HAND TRUCK.
APPLICATION FILED NOV. 27, 1914.

1,307,687.

Patented June 24, 1919.
2 SHEETS—SHEET 1.

Witnesses.
J. Morrill Fuller
William E. Gogen

Inventor.
Ralph M. Lovejoy,
by Heard Smith & Tennant.
Atty's.

R. M. LOVEJOY.
HAND TRUCK.
APPLICATION FILED NOV. 27, 1914.

1,307,687.

Patented June 24, 1919.
2 SHEETS—SHEET 2.

Inventor.
Ralph M. Lovejoy
by Heard Smith & Tennant
Atty's.

UNITED STATES PATENT OFFICE.

RALPH M. LOVEJOY, OF MEREDITH, NEW HAMPSHIRE.

HAND-TRUCK.

1,307,687.  Specification of Letters Patent.  Patented June 24, 1919.

Application filed November 27, 1914. Serial No. 874,105.

*To all whom it may concern:*

Be it known that I, RALPH M. LOVEJOY, a citizen of the United States, and resident of Meredith, county of Belknap, and State of New Hampshire, have invented an Improvement in Hand-Trucks, of which the following description, in connection with the accompanying drawing, is a specification, like characters on the drawing representing like parts.

This invention relates to elevating trucks such as are used for commercial purposes in transporting from place to place, usually by hand, more or less heavy loads. Such a truck comprises wheels and a load-supporting means usually in the form of a platform together with mechanism for raising and lowering the load-supporting means with respect to the wheels so that the truck can be backed beneath the load, the load-supporting means elevated with respect to the wheels to lift the load, and then at the end of the transporting movement the load-supporting means lowered and the truck removed.

The invention presents various combinations of mechanisms as a result of which a highly efficient truck is produced which can be readily operated by hand when the truck is in almost any conceivable position. The elevating movement is given by what may be termed a jack-lift mechanism wherein the raising mechanism is arranged substantially vertically and operates by a step by step movement under the action of a handle, preferably of the usual steering tongue, and this mechanism is so arranged that the elevating operation of the steering tongue may be given when the steering tongue is in any steering position.

Means are also preferably provided by which a relatively short movement of the tongue will raise the load-supporting means a single step at a time with a heavy load and by which a longer movement of the tongue will raise the load-supporting means a plurality of steps with a light load. By such construction a greatly increased leverage may be obtained over that employed when the load-supporting means is raised by a single movement of the handle or tongue so that heavier loads may readily be lifted. Furthermore, this construction permits the load to be raised to any desired height.

At the end of, or at a predetermined point in, the elevating operation suitable locking mechanism acts to lock the load-supporting means in its elevated position.

The present invention contemplates means for releasing the mechanism which locks the load-supporting means in elevated position without causing any material wear upon the parts by friction between the parts when they are disengaged while under the pressure of the load and without the necessity of removing the weight of the load from the locking mechanism before the lock can be disengaged.

Preferably interengaging means connected with the platform and vertically operable steering tongue, respectively, are employed to secure the elevating movement and the release of these connections is preferably effected automatically by raising the steering tongue at the conclusion of the elevating movement.

Means are also provided, either manually or automatically operated, by which when the load-supporting means has been elevated to a predetermined point, and locked, the steering tongue may be released from the performance of its elevating function and be left free for the steering of the truck. Hence the load-supporting means may be lowered independently of the tongue and dangerous movement of the tongue eliminated.

The lowering movement of the load-supporting means is cushioned through the action of a substantially vertically arranged dash pot which comes into action upon the release of the load supporting means or platform and gently lowers the load-supporting means without further attention on the part of the operator. The position of this dash pot eliminates all danger of leakage or spilling of the pressure medium.

The connections by which the load-supporting means or platform is elevated with respect to the wheels are such preferably that both the front and rear ends are simultaneously moved to the same extent and preferably also without any substantial relative horizontal movement. The connections comprise a lever connected to the front end of the load-supporting means and operable by the pawl and ratchet mechanism to raise the load-supporting means relative to the front wheel, means also being provided for causing a corresponding raising of the rear end relative to the wheels which support it. In the preferred form of construction, the pawl actuating member of the pawl and ratchet mechanism by means of which the elevating movement is preferably secured moves in the direction of the axis of the steering mechanism.

In order that the truck may readily be moved by pushing as well as pulling, the invention further contemplates means operable whereby the truck may be pushed and steered by the tongue either before or after loading.

The various novel features and combinations of mechanism whereby the desired results are secured will be more fully set forth in the accompanying description and drawings and will be defined by the appended claims.

In the drawings:

Fig. 2 is a plan view of the same partially in section on lines 2—2, Fig. 1, and, Fig. 3 is a detail front elevation of the truck, the steering mechanism and lifting mechanism being broken away, and, Fig. 4 is a detail elevation of mechanism for releasing the tongue from the lifting mechanism.

As illustrated in the drawing the load-supporting means of the truck is shown as a main frame comprising two desirably parallel side members or girders 1, 2 which may be made of angle iron, suitable side bearings 3 being secured to the underside of said girders 1, 2, to provide supports for a shaft 4 for the rear wheels 5 of the truck. The wheels may be and are provided with the usual roller or ball bearings.

The front ends of the girders 1 and 2 are connected by an arch shaped supporting member 6 provided at its central portion with a boss 7 having a central cylindrical journal adapted to receive a shaft or steering post. A suitable steering wheel 9 is mounted in antifriction bearings in a yoke 10 depending from the lower end of the shaft 8, said yoke being provided with an enlarged portion or boss 11 adapted to rest upon the under face of the boss 7.

The upper end of the shaft or steering post 8 is desirably connected by means of a pin 12 to a collar 13 resting upon the upper end of the boss 7, said collar 13 being provided with upwardly extending lugs 14 adapted to receive between them the vertically swinging steering tongue 15 which may be pivoted in said lugs by a bolt or pin 16. The tongue 15 is provided with a bifurcated rearward extension 17 having pins 18, 19 extending across the space between the bifurcations and adapted to engage and support a thrust member or strut which forms a part of the platform elevating mechanism which will hereinafter be described. The under surface of the tongue extension 17 is adapted to engage the upper surface of the collar 13 when the tongue is in the released position indicated in Fig. 1 so that the truck may be pushed by the operator with the steering wheel in any position and consequently may be manipulated either to position the platform or to transport the load to its destination. It is found in practice that a workman is oftentimes enabled to move a heavier load by thus pushing upon the tongue than he could by pulling upon the tongue in the usual manner.

The platform desirably comprises a pair of parallel members 20, 21 superposed over the side frames 1, 2 and connected at their rear ends by a cross beam 22 which desirably may extend beyond the side members 20, 21 flush with or beyond the outer planes of the truck wheels 5. The front ends of the members 20, 21 are desirably connected by an A-shaped standard rigidly secured to said members 20, 21 to form in effect a dash board for the platform, the A-shaped standard 23 being adapted to support the platform raising mechanism in a manner hereinafter to be described.

In order to provide for moving the platform vertically with respect to the main frame I preferably provide a system of levers which will raise the front and rear ends of the platform simultaneously and equally. This system of levers as disclosed herein comprises a pair of levers having arms located adjacent to the side frames 1, 2, said levers having extensions reaching substantially to the longitudinal axis of the truck through which the power may be transmitted to one of said levers and from it to the other lever. As illustrated herein the main lever 24 is supported upon a shaft 25 journaled in suitable brackets or lugs 26 extending upwardly from the side frames 1, 2 and is connected midway between the shaft 25 and its forward end 27 through a shaft 28 and links 29 to the sides 20 and 21 of the platform.

The rearward extension 30 of the lever 24 is desirably provided with a cylindrical end 31 which rests upon the flat surface of the end 32 of the second lever 33 which is fulcrumed upon a shaft 34 supported in suitable lugs 35 extending upwardly from the members 1 and 2 of the side frames. The opposite ends 36 of the members of the lever 33 engage a shaft or rod 37 which is journaled or supported at its ends in brackets 38 depending from the side members 20, 21 of the platform.

Preferably the distances between the shaft 28 and the fulcrum shaft 25 of the first mentioned lever and between the shaft 25 and the end bearing 31, and the distances between said end bearing 31, and the fulcrum shaft 34 of the lever 33 and between said shaft 34 and the end shaft or rod 37 are all equal so that when the end 27 of the lever 24 is raised, to raise the forward end of the platform for example two inches, the forward end of the lever 32 will be depressed two inches and its rear end raised two inches so that the platform is raised two inches throughout its length.

The longitudinal movement of the platform is substantially *nil*. As a matter of fact the longitudinal movement of the platform in a truck of 47 inches effective length is about an eighth of an inch when the platform is raised three inches.

So far as this feature of the invention is concerned any suitable mechanism may of course be utilized for raising the front end 27 of the lever 24. In this invention the vertical movement of the load-supporting means of the truck is secured by a mechanical step by step lifting mechanism operated in a manner analogous to the operation of a lifting jack, and this lifting mechanism obviously does not depend upon the particular character either of the load-supporting means or the means employed for permitting or securing vertical movement between the load-supporting means and the wheels of the truck.

In this invention the mechanism for elevating the load-supporting means also includes, as an independent feature of the platform type of load-supporting means, inter-engaging members connected respectively to the platform and to the tongue which members are adapted to be operated by lowering the tongue to raise the platform, when the platform has been raised to a predetermined position and locked therein, to be then disengaged automatically as the tongue is raised to steering position.

In the preferred form of the invention disclosed herein the lifting mechanism comprises a link 40 which may be pivotally mounted at its lower end in a slot or bifurcation in the end 27 of the lever 24. The upper end of the link 40 may desirably project into a slot 40˟ in a sector shaped arm 41 and may be secured to said arm by a suitable pin 42. The arm 41 conveniently may be mounted upon a stud 43 in the upper end of the A-shaped standard 23, the forward end of the sector being provided with a series of teeth or notches 44 adapted to be engaged by a pawl 45 pivotally mounted in lugs 46 upon a lever 47 which likewise may be pivotally mounted upon the stud 43. The lever 47 desirably is bifurcated so that its legs will extend outside of the sector 41. The forward end of the lever 47 desirably may be provided with a spherical socket 48 adapted to receive the spherical end 49 of a vertical compression member or strut 50 normally supported upon the pin 18 in the tongue extension 17. It will however be understood that other forms of pivotal, preferably universal, connections may be used to connect the strut 50 with the lever 47 so that the lever 47 may be actuated when the tongue is in any steering position. The strut 50 may be wider at the bottom than at the top as illustrated and provided at its lower end with a notch 51 adapted to be engaged by the pin 19 of the tongue extension 17 when the tongue is sufficiently depressed to raise the pin 19 into engagement with the end of the strut 50. This strut, which is the pawl actuating member, it will be observed reciprocates substantially in the direction of the axis of the steering mechanism because its line of movement is substantially parallel to this axis. Thus its action is the same at any steering position of the tongue.

It will be obvious from the construction illustrated and above described that when the tongue 15 is depressed it will swing about its pivot 16 and will raise the pin 18 and with it the strut 50 thus lifting the lever 47 and through the pawl 45 the sector shaped arm 41. This sector shaped arm being connected by the link 40 with the end 27 of the lever 24 will raise the end 27 of the lever thus lifting the front end of the platform through the link 29 and simultaneously actuating the lever 33 to lift the rear end of the platform the same distance as the front end is raised. The mechanism between the tongue and the sector shaped member is desirably so proportioned that a relatively short pull upon the tongue will cause the sector shaped arm 41 to be raised a distance corresponding to one of the teeth 44 thereupon, suitable means being provided to lock the platform against descent upon each step.

In order to raise the platform more rapidly when a light load is lifted the tongue may be depressed to a greater extent than is necessary to raise the platform one notch, whereupon the pin 19 of the tongue extension will engage the notch 51 in the strut and by reason of the longer leverage upon the tongue will raise the strut 50 a distance corresponding to two or three notches upon the sector 41.

Figures 2, 3, 4:
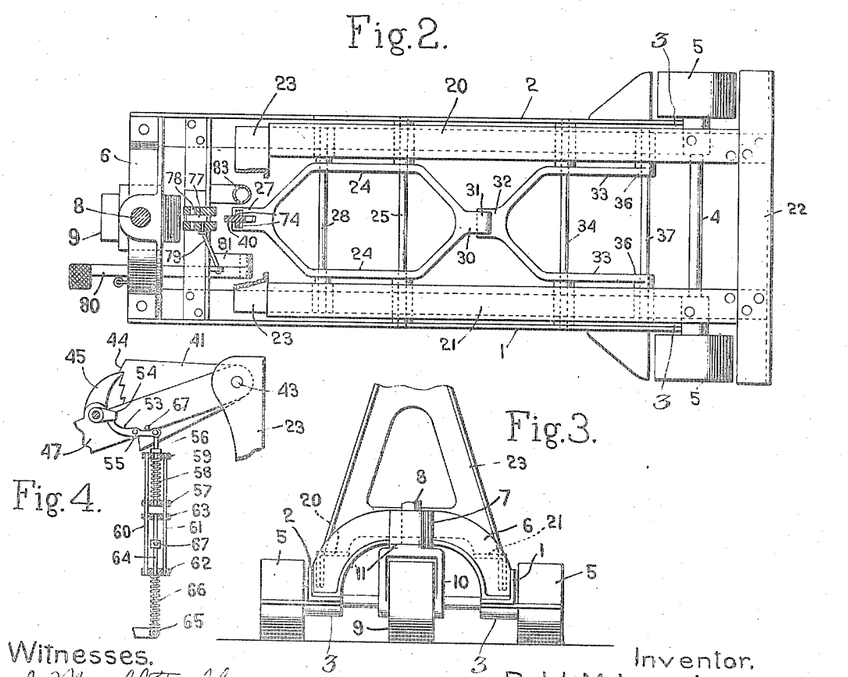

When the platform has been lifted to the required height and locked the tongue must be freed from connection with the elevated mechanism in order that the truck may be steered thereby and drawn to its destination and in order to prevent the tongue from being thrown back by the load when the platform is released. This may be accomplished by merely rotating the dog 45 out of engagement with the ratchet teeth 44, a suitable handle 52 being provided for this purpose. The said interengaging means may also be arranged to disengage automatically by raising the tongue when the platform is locked in elevated position. As a preferred arrangement means are provided for automatically disengaging the dog 45 when the load has been elevated. In Fig. 4 I have illustrated a suitable means for disengaging the interengaging members, viz:—the sector 41 and the dog 45 which are connected respectively to the platform and the tongue, which means is shown as an automatic dog releasing mechanism comprising a lever 53 engaging at one end an arm 54 extending laterally from the shaft which carries the dog 45, said lever 53 being pivoted upon a pin 55 extending laterally from the lever 47. The other end of the lever 53 is connected to a rod 56 having at its end a collar 57 which supports a spring 58 surrounding the rod 56 under tension against one end 59 of a yoke comprising rods 60, 61 and a collar 62. A collar 63 slidably mounted upon the rods 60—61 beneath the collar 57 is attached to a rod 64 which is pivotally connected at its lower end to a stud 65 upon the main frame, a spring 66 being interposed between the base of the rod 64 and its support 65 and bearing upon the underside of the collar 62. An adjustable collar 67 which may be fastened to the rod 64 by a set screw is mounted upon the rod 64 between the collars 60 and 62 and is adapted to be so positioned that when the lever 47 is raised to a predetermined point, as for example the second or third of the notches 44 the collar 67 will bear upon the upper side of the member 62 of the yoke and further upward movement of the lever 47 will raise the rod 56 and its collar 57 against the tension of the spring 58 thus causing the end of the lever 53 to bear against the arm 54 of the dog. During the elevating operation however the dog 45 is firmly in engagement with the teeth 44 of the sector and will not be removed from such engagement by pressure of the lever 53 upon the arm 54 of the dog. When however the elevating operation is completed and the pressure of the dog 45 against the tooth 44 is relieved the resiliency of the spring 58 will instantly flip the dog out of engagement with the tooth 44 of the sector thus releasing the tongue from the elevating mechanism.

The spring 66 cushions the downward movement of the releasing mechanism and also serves to hold the lever 53 normally in engagement with the pin 67 so that its opposite end does not press upon the arm 54 of the dog.

Figure 5:
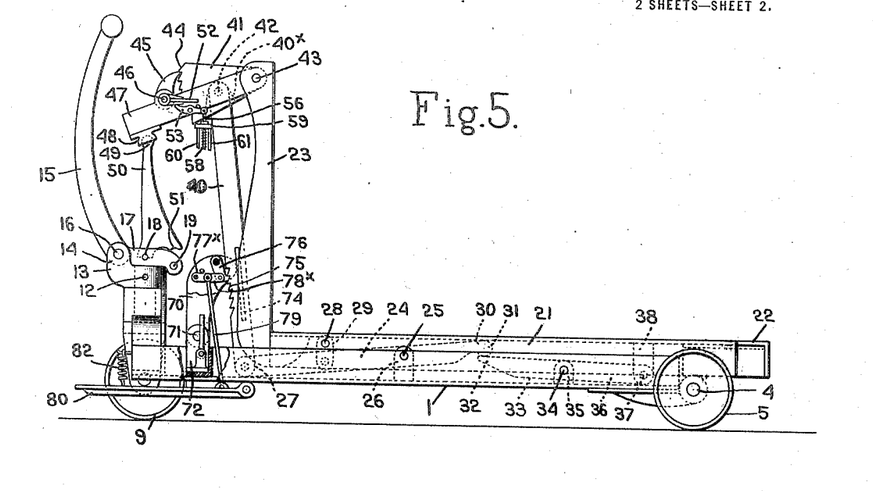
Fig. 5 is a side elevation of the truck a portion thereof being broken away to show the locking mechanism for retaining the platform in elevated position.
Figure 6:
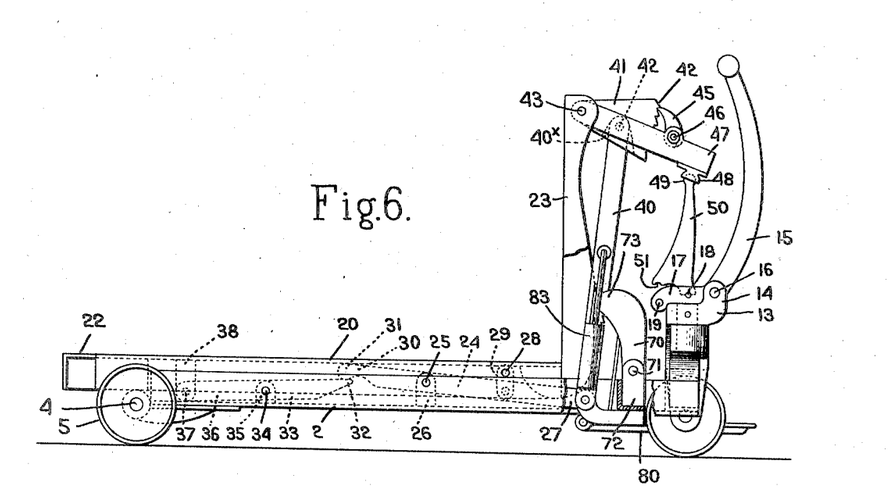
Fig. 6 is an elevation of the opposite side of the truck partly broken away to show the position of the dash pot for cushioning the descent of the platform.
Figure 7:
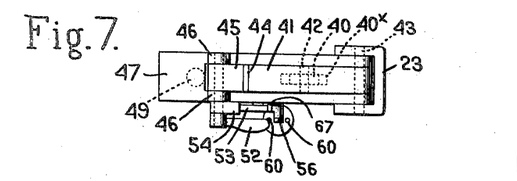
Fig. 7 is an enlarged detail plan view of the lever and the pawl and ratchet mechanism which is connected to the platform standard and the means for releasing the pawl.

I have provided a novel pawl and ratchet mechanism for retaining the platform in any desired raised position and for easily releasing the retaining mechanism when it is desired to deposit the load at its destination without causing any material wear upon the parts by friction between the parts when they are disengaged while under the pressure of the load. This mechanism preferably comprises an arm 70 pivotally secured upon a stud 71 carried by a bracket 72 supported from the main frame girders 1 and 2, the arm 70 preferably is bifurcated to embrace the link 40 and rounded at its end 73 so that the rounded portion may bear against flanges 74 extending laterally from the sides of the link 40 which is provided upon its forward edge with a series of teeth 75 corresponding to the teeth 44 of the sector shaped arm 41. At the upper end of the arm 70 a dog 76 is pivoted in such a manner that it normally tends to drop away from and out of engagement with the teeth 75 on the link 40. In order however to hold the dog normally in engagement with said link I have provided a cam 77 which is pivotally mounted upon the stud 78 in front of said dog and normally holds the dog firmly in engagement with a tooth upon the link 40. It will be understood that any suitable mechanism may be provided for retaining the dog in engagement with the teeth upon the link 40 and that for example a toggle may be substituted for the cam above referred to. As illustrated in Fig. 5 this toggle may comprise a pair of pivotally connected links $77^x$ and $78^x$, one of the links $77^x$ being pivotally connected to the arm 60 and the other link $78^x$ to the dog 76.

Figure 1:
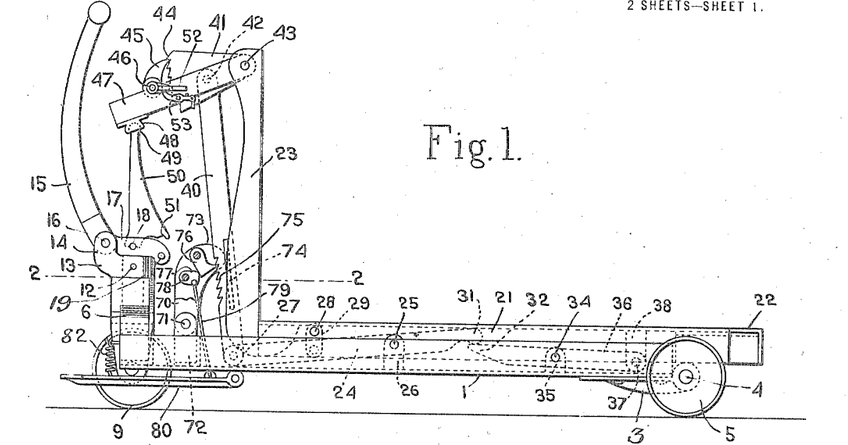
Figure 1 is a side elevation of a truck embodying one of the preferred forms of my invention.

In order to remove the cam from its engagement with the dog 76 said cam is connected by a link 79 with a foot lever 80 which may be pivoted in any convenient manner upon the main frame as upon a bracket 81 depending from the main frame. The foot lever is desirably held in elevated position by a spring 82 which also tends to hold the cam 77 in proper engagement with the dog 76 through the connecting link 79, or if a toggle mechanism such as illustrated in Fig. 5 is employed, will serve normally to maintain the links $77^x$, $78^x$ in axial alinement or locking position, in such case the link preferably being pivotally connected to the stud which pivotally connects said links. It will be obvious that upon the depression of the foot lever 80 the cam 77 will be rotated about its pivot 78 and removed from the back of the dog 76 permitting the dog to swing outwardly and release the link 40 so that the same may drop freely. The rounded extensions 73 of the arm 70 resting against the flanges 74 upon the link 40 retain the arm 70 in place while the link 40 descends so that immediately upon the release of the foot lever the dog and cam will assume their normal position as illustrated in Fig. 1.

A further feature of this invention combines with mechanism for mechanically elevating the load-supporting means step by step, a means for securing the gradual and automatic lowering of the load-supporting means when released, such for example, as an ordinary type of dash-pot. Such a device lowers the load-supporting means with the superimposed load gently into place. In this invention also this means for gradually and automatically lowering the load-supporting means is so arranged as to secure the lowering movement vertically and consequently the dash pot is arranged in vertical position. Furthermore, the vertical position of the dash pot conserves the fluid medium employed and prevents the possibility of its spilling or leaking during the operations of raising and lowering. In its preferred form, it is also combined with that preferred form of load releasing means which is lifted vertically both at the front and at the rear end and preferably also with the steering handle which can be operated in any steering position. A dash pot 83 is provided in the present instance with the plunger thereof connected to the link 40 and with the dash pot supported upon the main frame of the machine or a cross girder extending between the girders 1, 2 in any convenient manner. By this arrangement the dash pot is maintained in a substantially vertical position and loss of the fluid contents thereof by leakage is entirely prevented. The dash pot is located between the load supporting area of the platform or load supporting means and the steering mechanism, thus enabling the vertical movement of the platform to take place with the vertically arranged dash pot so positioned that it will be protected from harm. By connecting the plunger of the dash pot to the link 40 its movement will be equal to that of the link 40 which is actuated through the sector 41. The movement of the link is therefore equal to that of the end of the lever 44 which supports and elevates the front end of the platform and is much greater than the movement of the platform itself. It therefore follows that the movement of the plunger of the dash pot is considerably greater,—in the mechanism illustrated herein twice as great— as the movement of the platform. Consequently a dash pot may be employed which will operate more gradually and more effectively to cushion the descent of the load than is possible in dash pots in which the plunger has the same extent of movement as that of the load supporting means.

In operation the truck is first backed beneath the load to be transported and properly positioned in respect to the center of gravity of the load. The free movement of the forward or steering wheel of the truck in the present case permits such an arrangement even though the tongue of the truck be in the raised position illustrated in Fig. 1. When the truck has been properly positioned beneath its load the tongue is drawn down raising its extension 17 and through the strut 50 the lever 47, the dog carried by the lever 47 being in engagement with the first tooth 44 of the sector 41 causes the same to be lifted, thus raising the link 40 so that the dog 76 engages the second tooth in the link 40, the dog being retained therein by the cam 77 in the manner above described. The raising of the link 40 elevates the end 27 of the lever 24 thus raising the front end of the platform one half the distance moved by the link 40 through the links 29. At the same time the opposite end of the lever 24 bears downwardly upon the end 32 of the lever 33 causing the opposite end of said lever to raise the rear end of the platform a distance equal to that traversed by the front end thereof. The tongue is then again raised depressing the extension 17 and permitting the forward end of the lever 47 to descend so that the pawl 45 will engage the next lowest tooth 44 of the sector 41. Upon depression of the tongue the sector 41 will be raised another tooth in the same manner as before and the platform simultaneously lifted. As before stated the parts are so arranged that a relatively short and convenient movement of the tongue 15 will raise the link 40 one tooth upon each depression of the tongue. However, where light loads are being handled or where the platform of the truck is raised without the load it is frequently desirable to have a more rapid movement. To this end the other end of the extension 17 is provided with the pin 19 which upon an unusual depression of the tongue 15 will engage the notch 51 in the stud 50 and upon further depression will raise the lever 47 more rapidly and through a greater distance since the arc through which the pin 19 passes is considerably greater than that traversed by the pin 17 so that the further depression of the tongue 15 may cause the lever 47 to raise the sector 41 a sufficient distance to elevate the link 40 two or three teeth as may be desired.

It will be observed that the axis of the post 8 of the steering wheel is co-incident with the axis of the strut 50 in the preferred construction illustrated herein so that the steering wheel of the truck may be turned in any direction even though the tongue 15 is in the elevated position illustrated or in any intermediate position. This construction also enables the platform to be elevated with the steering wheel and handle in any desired position. This feature permits the easy manipulation of the truck in positioning it beneath its load and enables the operator to bring the tongue into a position in which it may be manipulated easily.

Furthermore when the platform has been raised and lowered as above described the pawl 45 may be entirely disengaged from the sector 41 so as to permit the further raising and lowering of the tongue 15 during the transportation of the load to its destination without affecting the platform elevating mechanism. When the truck has reached its destination the load may be deposited by merely depressing the foot lever 80 which causes the removal of the cam from engagement with the dog 76 and permits the link 40 and platform to descend as above described. The truck may then be withdrawn from beneath the load.

It will be understood that the embodiment of the invention disclosed herein is illustrative merely and is not restrictive and that the invention as set forth in the following claims may be embodied in various other forms within the spirit and scope thereof.

Having thus described my invention what I claim as new and desire to secure by Letters Patent is;

1. In an elevating truck comprising a main frame supported upon wheels and having a steering mechanism operable by a tongue connected thereto, a lever mounted on said frame, a platform supported at one end upon said lever, means operable by said lever simultaneously to raise the other end of said platform, pawl and ratchet mechanism operable by the vertical reciprocation of said tongue to actuate said lever to elevate the platform step by step and means for locking the platform at each step of elevation.

2. An elevating truck comprising a main frame supported upon wheels and having steering mechanism operable by a tongue pivotally connected thereto, a lever mounted on said frame, a platform supported at one end upon said lever and means operable by said lever simultaneously to raise the other end of said platform, means for actuating said lever including pawl and ratchet mechanism operable by said tongue when the same is in any steering position to raise the platform step by step and means for locking the platform against descent at each step whereby the tongue may be released from effective elevating engagement and used to guide the truck.

3. An elevating truck comprising a main frame supported upon wheels and having a steering mechanism operable by a tongue pivotally connected thereto, a platform supported upon said main frame, means for raising said platform step by step including a pawl and ratchet mechanism located intermediate of the front end of the platform and the steering mechanism and operable by vertical reciprocation of the tongue and coöperating means located between the end of the platform and the steering mechanism for locking the platform at each step of elevation.

4. An elevating truck comprising a main frame supported upon wheels and having a steering mechanism including a vertical steering post operable by a tongue pivotally connected thereto, a platform supported upon the main frame, means for raising simultaneously both ends of the platform step by step including a pawl carrying lever and a coöperating ratchet located intermediate of the end of the platform and the steering post and operable by the raising and lowering of the tongue, and coöperating pawl and ratchet mechanism located between the end of the platform and said steering mechanism for locking the platform in raised position whereby the tongue may be released and means for disengaging said locking mechanism to permit the platform to descend.

5. An elevating truck comprising a main frame having a pair of rear wheels, a front steering wheel having a vertical steering post journaled in said frame, a tongue pivotally mounted upon said steering post and having means to restrict its upward movement when the tongue is in any guiding position whereby the truck may be pushed or pulled and guided by said tongue with the steering wheel in any guiding position, a platform mounted upon said frame and means operable by the raising and lowering of the tongue to raise the platform step by step.

6. An elevating truck comprising a main frame supported upon wheels and having steering mechanism including a tongue mounted to swing vertically, a platform having a rigid vertical standard, means including a lever mounted upon said main frame adapted to support said platform and operable to raise the platform vertically relatively to said main frame without endwise movement and means carried by the platform standard and operable by raising and lowering said tongue for actuating said platform supporting means.

7. An elevating truck comprising a main frame, a platform having a rigid vertical standard, a system of levers mounted upon said main frame adapted to support said platform and to raise the same vertically in respect to the main frame, lever actuating mechanism mounted upon the platform standard connected to the platform supporting levers and means for actuating said lever actuating mechanism.

8. An elevating truck comprising a main frame, a platform having a rigid vertical standard and a system of levers for supporting and for raising said platform, elevating mechanism for said levers comprising a toothed sector pivoted upon said platform standard and connected to said supporting levers, an elevating lever having a dog adapted to engage the teeth upon said sector, and means for raising and lowering said elevating lever to raise the platform step by step, and means for locking the platform against descent at each step.

9. An elevating truck comprising a main frame, a platform having a rigid vertical standard and a system of levers for supporting and for raising said platform, elevating mechanism for said levers comprising a toothed sector pivoted upon said platform standard and connected to said supporting levers, an elevating lever having a dog adapted to engage the teeth upon said sector, and means for raising and lowering said elevating lever to raise the platform step by step, means for locking the platform against descent at each step, and means automatically operated at a predetermined step for releasing the dog from engagement with the sector.

10. An elevating truck comprising a main frame, a platform having a rigid vertical standard and a system of levers for supporting and for raising said platform, elevating mechanism for said levers comprising a toothed sector pivoted upon said platform standard and connected to said supporting levers, an elevating lever having a dog adapted to engage the teeth upon said sector, and means for raising and lowering said elevating lever to raise the platform step by step, means for locking the platform against descent at each step, and means automatically operated at a predetermined step for releasing the dog from engagement with the sector comprising a spring pressed member connected to said dog adapted to be actuated when the dog reaches the predetermined tooth to automatically disengage said dog when downward pressure upon the lifting lever is removed.

11. An elevating truck comprising a main frame, a pivotally mounted steering wheel having a tongue secured thereto and adapted to guide the same, a platform, means including a lever mounted upon said main frame for supporting said platform, and mechanism operable by the lowering of said tongue to actuate said lever to raise the platform when the steering wheel is in any guiding position.

12. An elevating truck comprising a main frame, a pivotally mounted steering wheel having a tongue secured thereto and adapted to guide the same, a platform, a system of levers mounted upon said main frame and supporting said platform, mechanism operable by repeatedly raising and lowering said tongue to actuate said levers step by step, and means to prevent retrograde movement of the platform when the tongue is raised.

13. An elevating truck comprising a main frame having a pair of rear wheels, a front steering wheel having a vertical steering post journaled in said frame, a collar secured to said steering post, a tongue pivotally mounted upon said collar and having an extension adapted to engage said collar and limit the pivotal movement of said tongue, a platform mounted upon said frame and elevating mechanism for said platform including a member pivoted upon said tongue extension and reciprocable vertically in line with the axis of said steering post whereby the elevating mechanism may be operated with the tongue in any steering position.

14. An elevating truck comprising a main frame having a pair of wheels at its rear end and a yoke at its front end, a steering wheel mounted upon a steering post journaled in said yoke, a tongue pivotally secured to said steering post and having a rearward extension, a platform mounted upon said main frame, means for raising and lowering the platform including a lever extending across the axis of the steering post and means connecting the tongue extension with said lever substantially axially of the pivot of the steering post whereby said tongue may be raised or lowered when the steering wheel is in any position.

15. An elevating truck comprising a main frome having a pair of wheels at its rear end and a yoke at its front end, a steering wheel mounted upon a steering post journaled in said yoke, a tongue pivotally secured to said steering post, a platform having a vertical forward standard, means for supporting said platform upon said truck to permit the platform to be elevated in respect thereto, means for elevating said platform including an elevating lever pivotally mounted upon the vertical standard of the platform and connected to said supporting means, means operable by said tongue in axial alinement with the steering post to raise said elevating lever whereby the platform may be raised and lowered when the steering wheel is in any position.

16. An elevating truck comprising a main frame having a pair of wheels at its rear end and a yoke at its front end, a steering wheel mounted upon a steering post, journaled in said yoke, a tongue pivotally secured to said steering post and having a rearward extension, a platform mounted upon said main frame and means for raising and lowering the same comprising a lever extending across the axis of the steering post, a strut engaging said lever substantially axially of the steering post having at its lower end recesses adapted to engage studs upon the tongue extension located at different distances from the pivot thereof whereby said lever will be actuated through the stud nearest the fulcrum when a heavy load is being lifted and by the stud more distant from the fulcrum upon further depression of the tongue when a light load is being lifted.

17. In an elevating truck comprising a main frame, a platform movable relatively to the main frame; means for locking the platform against descent including a ratchet and a coöperating depending dog pivotally mounted upon an axis located at a distance from the teeth of said ratchet to cause the dog when hanging freely normally to swing away from said ratchet, means for locking the dog against said ratchet and manually operable means for releasing said locking means whereby the dog will be permitted to fall away from the ratchet and the platform allowed to descend.

18. In an elevating truck comprising a main frame, a platform mounted thereon and means for elevating the platform step by step, means for locking the platform against descent at each step comprising a ratchet connected to said platform, and movable vertically therewith, a member pivotally mounted upon said main frame having a depending dog pivotally mounted upon its upper end adapted to engage the teeth of said ratchet, means for normally forcing the dog into engagement with the ratchet and means for releasing said dog.

19. In an elevating truck comprising a main frame, a platform mounted thereon and means for elevating the platform step by step, means for locking the platform against descent at each step comprising a ratchet connected to said platform, a member pivotally mounted upon said main frame having a depending dog pivotally mounted upon its upper end adapted to engage the teeth of said ratchet including a cam and means for releasing said cam from said dog to permit the latter to withdraw from engagement with the ratchet.

20. In an elevating truck comprising a main frame, a platform mounted thereon and means for elevating the platform step by step, means for locking the platform against descent at each step comprising a ratchet connected to said platform, a member pivotally mounted upon said main frame having a depending dog pivotally mounted upon its upper end adapted to engage the teeth of said ratchet, means for normally forcing the dog into engagement with the ratchet and means for releasing said dog including a pivotally mounted member, a foot lever normally supported by a spring, a rod connecting said pivotally mounted member to said foot lever whereby the pivotally mounted member is normally forced into engagement with said dog but may be removed therefrom by the depression of said foot lever to permit the dog to withdraw from engagement with the ratchet.

21. In an elevating truck comprising a main frame, a platform having a standard mounted thereon and means including lever mechanism connected to said standard for elevating the platform step by step, means for locking the platform against descent at each step comprising a ratchet connected to said platform, a member pivotally mounted upon said main frame having a depending dog pivotally mounted upon its upper end adapted to engage the teeth of said ratchet, means for normally forcing the dog into engagement with the ratchet and means for releasing said dog to permit the platform to descend and a dash pot interposed between said main frame and said lever mechanism to cushion the descent of the platform.

22. In an elevating truck comprising a main frame having a pivotally mounted steering wheel at the forward end thereof and a tongue pivotally connected to said steering wheel, a platform having a standard, and means including lever mechanism pivotally mounted upon said platform standard and operable by the raising and lowering of the tongue to raise the platform relatively to the main frame, means for locking the platform in elevated position, means for releasing the locking means, a dash pot supported upon said frame in substantially vertical position and having its plunger connected to said lever mechanism.

23. An elevating truck comprising a main frame and a pivotally mounted steering wheel on the forward end thereof, a tongue secured to said steering wheel, a platform, a system of levers mounted upon said main frame and supporting said platform, a standard at the forward end of the platform and means for actuating the supporting levers to raise the platform step by step supported by said standard intermediate of the standard and the vertical axis of said steering wheel and means operable by said tongue for operating said lever actuating means.

24. An elevating truck comprising a main frame having a steering wheel pivotally mounted at the forward end thereof, a platform, a system of levers mounted on said main frame and supporting said platform, a tongue secured to said steering wheel and adapted to guide the same and means for actuating said supporting levers from said tongue when the latter is in any guiding position.

25. In an elevating truck comprising a main frame provided with a pair of rear wheels and a steering wheel having a vertical steering post, a tongue mounted upon a horizontal fulcrum upon said steering post, a platform having a standard, elevating mechanism for said platform including a member pivotally connected to said standard extending from said standard across the axis of said steering post and a strut connected to said tongue engaging said member in the line of the axis of said steering post whereby vertical movement of the tongue when in any steering position will raise said platform and means for locking said platform against descent.

26. In an elevating truck comprising a main frame provided with a pair of rear wheels and a steering wheel having a vertical steering post, a tongue mounted upon a horizontal fulcrum upon said steering post, a platform having a standard, elevating mechanism for said platform including a lever pivotally connected to said standard and extending over the axis of said steering post, a strut pivoted upon said tongue and connected to said lever by a universal joint located in line with the axis of said steering post whereby vertical movement of said tongue when in any steering position will raise the platform and means for locking the platform against descent.

27. An elevating truck comprising a main frame having a steering wheel pivotally mounted at the forward end thereof, a platform, a system of levers mounted on said main frame and supporting said platform, a tongue secured to said steering wheel and adapted to guide the same, and means for actuating said supporting levers from said tongue when the latter is in any guiding position to raise said platform step by step, means for locking the platform against descent at each step and means for releasing said locking means to permit the descent of the platform.

28. An elevating truck comprising a main frame supported upon wheels and having steering mechanism operable by a tongue connected thereto, a lever mounted on said frame, a platform supported at one end on said lever, means operable by said lever simultaneously to raise the other end of said platform, means operable by the reciprocation of said tongue to actuate said lever to elevate the platform step by step and means for locking the platform at each step of elevation.

29. An elevating truck comprising a main frame, steering mechanism including a tongue, a platform, a standard, a lever pivoted on said standard, means connecting said lever to said platform operable by said lever to raise the platform relatively to said main frame, and means connecting said tongue to said lever acting upon the reciprocation of said tongue when in any steering position to actuate said lever to raise said platform.

30. An elevating truck comprising a main frame, steering mechanism including a tongue, a platform, a standard, a lever pivoted on said standard, means connecting said lever to said platform operable by said lever to raise the platform relatively to the main frame, and means connecting said tongue to said lever acting upon the reciprocation of said tongue when in any steering position to actuate said lever to raise said platform step by step and means for locking said platform against descent at each step of elevation.

31. An elevating truck comprising a main frame having steering mechanism including a tongue, a platform mounted upon said main frame, means for elevating said platform relatively to said main frame including a toothed member pivotally connected to said platform and means operable by said tongue adapted to engage successive teeth on said toothed member to raise the platform step by step and means for locking the platform against descent at each step of elevation.

32. An elevating truck comprising a main frame having a steering mechanism including a tongue, a platform, means for supporting the ends of said platform operable to raise the same vertically relatively to said frame, lifting-jack mechanism located between the end of said platform and the steering mechanism including a toothed member pivotally connected to the platform supporting means and a lever having a pawl adapted to engage successive teeth on said toothed member whereby the reciprocation of said lever will raise the platform step by step and means for locking the platform against descent at each step of elevation.

33. An elevating truck comprising a main frame having a pivotally mounted steering wheel, a platform, means including a lever mounted on said main frame for supporting said platform, a tongue secured to said steering wheel and adapted to guide the same and means for actuating said supporting lever from said tongue when the latter is in any guiding position.

34. An elevating truck comprising a main frame, a platform mounted thereon, means for elevating the platform step by step, means for locking the platform against descent at each step of elevation, comprising a coöperating toothed member forming a ratchet and a depending pawl connected respectively to the platform and the frame and tending normally to disengage and means for holding the pawl in engagement with said toothed member operable to permit the release of the pawl without requiring diminution of the weight upon said locking mechanism.

35. An elevating truck comprising a main frame, a platform mounted thereon, means for elevating the platform step by step, means for locking the platform against descent at each step of elevation, comprising a coöperating toothed member forming a ratchet and a depending pawl connected respectively to the platform and the frame and tending normally to disengage and means for holding the pawl in engagement with said toothed member including a plurality of coöperating pivotally mounted members operable to force the pawl firmly into engagement with said toothed member and to release said pawl without diminution of the weight upon the locking mechanism.

36. In an elevating truck comprising a platform, steering mechanism including a tongue mounted to swing vertically, substantially vertically arranged pawl and ratchet mechanism for lifting the platform including a pawl actuating member connected to the tongue reciprocable substantially in the direction of the axis of the steering mechanism by the raising and lowering of the tongue, and means for locking the platform in elevated position.

37. In an elevating truck comprising a platform, a steering wheel having a vertical steering post, a tongue pivotally connected to said steering post to swing vertically, a substantially vertically positioned pawl and ratchet mechanism including a pawl actuating member connected to the tongue reciprocable substantially in the direction of the axis of the steering post by the raising and lowering of the tongue, means operable by said pawl and ratchet mechanism to raise the front end of the platform step by step and lever mechanism also operable by said pawl and ratchet mechanism to raise the rear end of the platform.

38. In an elevating truck comprising a platform, a steering wheel having a vertical steering post, a tongue pivotally connected to said steering post to swing vertically, a substantially vertically positioned pawl and ratchet mechanism including a member connected to the tongue reciprocable substantially in the direction of the axis of the steering post by the raising and lowering of the tongue, a lever connected to the front end of the platform operable by said pawl and ratchet mechanism and means operable by the movement of said lever for raising the rear end of said platform.

39. In an elevating truck comprising a steering mechanism including a tongue mounted to swing vertically and load-supporting means, means operable by the vertical movement of said tongue for elevating said load-supporting means and means for locking the load-supporting means in an elevated position; a substantially vertically arranged dash-pot having a closed bottom, located between the load supporting area of said load supporting means and said steering mechanism, connected to said load-supporting means and operable to cushion its descent when said locking mechanism is released.

40. In an elevating truck comprising a steering mechanism including a tongue mounted to swing vertically, load-supporting means and mechanical means operable by the vertical movement of said tongue for elevating said load-supporting means step by step, mechanical means for locking said load-supporting means in an elevated position, a substantially vertically arranged dash-pot having a closed bottom operable to cushion the descent of the load-supporting means when the latter is unlocked.

41. In an elevating truck comprising steering mechanism including a tongue mounted to swing vertically and load supporting means, means operable by the vertical movement of said tongue for elevating said load supporting means and means locking the load supporting means in elevated position; a dash pot and means connecting the plunger of said dash pot to said load supporting means operating to cause the plunger of the dash pot to have a greater range of movement than that of the load supporting means.

42. In an elevating truck comprising a main frame, steering mechanism including a tongue mounted to swing vertically and a platform; interengaging means including a member connected to said tongue and a coöperating member connected to said platform, normally maintained in engagement and operable by vertical raising and lowering movements of said tongue to lift the platform step by step, means for locking the platform in elevated position, and means for automatically disengaging said interengaging means upon raising the tongue when the platform is locked in predetermined elevated position.

43. In an elevating truck comprising a main frame, steering mechanism including a tongue mounted to swing vertically and a platform; interengaging means including a pivotally mounted member connected to said tongue and a coöperating member connected to said platform, normally maintained in engagement and operable by vertical raising and lowering movements of said tongue to lift the platform step by step, means for locking the platform in elevated position, and spring-actuated means for automatically disengaging sad interengaging means when the platform is in a predetermined elevated position.

44. In an elevating truck comprising load-supporting means, wheels, and means for raising said load-supporting means relatively to said wheels; means for locking said load-supporting means against descent including a pair of members tending normally to disengage, means for locking said members in engagement and means for releasing said member-locking means to permit said members to disengage and allow the load-supporting means to descend.

45. In an elevating truck comprising load-supporting means, wheels, and means for raising said load-supporting means relatively to said wheels; means for locking said load-supporting means against descent including a ratchet and a pivotally supported dog tending normally to swing away from engagement with said ratchet, means for locking said dog in engagement with said ratchet and means for releasing said dog-locking means, whereby said dog will be permitted to withdraw from engagement with said ratchet and the load-supporting means allowed to descend.

46. In an elevating truck comprising load supporting means, wheels and means for raising said load supporting means relatively to said wheels, means for locking said load supporting means against descent including a ratchet and a coöperating member pivotally supported at one end and having at its opposite end a pivotally mounted dog adapted to engage the teeth of said ratchet and releasing means for said dog operable to permit rotative movement of the dog about its pivot whereby the locking means may be readily released 47. In an elevating truck comprising load supporting means, wheels and steering mechanism including a tongue mounted to swing vertically, a lever pivotally mounted upon said load supporting means and movable bodily therewith, pawl and ratchet mechanism connecting said tongue to said lever operable by the vertical swinging movement of the tongue, said pawl and ratchet mechanism having a greater range of movement than the bodily movement of said lever whereby a ratchet having relatively coarse teeth may be employed.

48. In an elevating truck comprising load supporting means, wheels and steering mechanism including a tongue mounted to swing vertically, a lever pivotally mounted upon said load supporting means and movable bodily therewith, means operable by the movement of said lever about its pivot to raise said load supporting means, means operable by the raising and lowering of said tongue to actuate said lever to raise said load supporting means step by step and means for locking said load supporting means against descent at each step of elevation.

49. In an elevating truck comprising load supporting means, wheels and steering mechanism including a tongue mounted to swing vertically, a lever pivotally mounted upon said load supporting means and movable bodily therewith, means operable by successive swinging movements of said tongue to engage and move the end of said lever step by step, means connected to said lever at a shorter distance from its pivot than the distance from said pivot to the end of said lever and operable by the pivotal movement of said lever to elevate said load supporting means and means for locking said load supporting means against descent at each step of elevation.

50. In an elevating truck comprising load supporting means, wheels and steering mechanism including a tongue mounted to swing vertically, a lever pivotally mounted upon said load supporting means and movable vertically therewith, means including ratchet mechanism between said tongue and said lever through which power is applied to the lever and operable by the raising and lowering of said tongue to actuate said lever step by step, means engaging said lever between the pivot of said lever and the point at which power is applied to said lever and acting to elevate said load supporting means and means for locking said load supporting means against descent at each step of elevation.

51. In an elevating truck comprising load supporting means, wheels and steering mechanism including a tongue mounted to swing vertically, means for elevating the load supporting means relatively to said wheels including releasable interengaging members connected respectively to said tongue and said load supporting means and operable by successive raising and lowering movements of the tongue to raise said load supporting means step by step, means for locking said load supporting means in elevated position and means acting automatically to disengage said interengaging members when the tongue is raised with load supporting means locked in a predetermined elevated position.

52. In an elevating truck comprising load supporting means and means for elevating the same including releasable interengaging members and means independent of said elevating means for sustaining said load supporting means, power storing means capable of being energized by the movement of the load supporting means and operating when energized to release said interengaging members when the load supporting means is sustained in a predetermined position and the pressure between said interengaging members relieved.

53. In an elevating truck comprising load supporting means, means for elevating the same including releasable interengaging members and means independent of said elevating means for sustaining said load supporting means, resilient means adapted to be placed under stress by the movement of said load supporting means in one direction and operating to release said interengaging members when the load supporting means is sustained in a predetermined position and the pressure between said interengaging members relieved.

54. In an elevating truck comprising a load supporting means, steering mechanism including a tongue mounted to swing vertically, releasable interengaging members connected respectively to said tongue and said load supporting means operable by the vertical movement of said tongue to elevate said load supporting means, means to sustain said load supporting means in a predetermined position, a spring adapted to be placed under stress by the movement of said load supporting means in one direction and operating to release said interengaging members when the load supporting means is sustained in a predetermined position and the pressure between said interengaging members relieved.

In testimony whereof, I have signed my name to this specification, in the presence of two subscribing witnesses.

RALPH M. LOVEJOY.

Witnesses:
 FREDERICK A. TENNANT,
 THOMAS J. DRUMMOND.